United States Patent [19]

Derleth et al.

[11] Patent Number: 4,601,992

[45] Date of Patent: Jul. 22, 1986

[54] PRODUCT AND PROCESS FOR THE PRODUCTION OF GRANULES OF HIGH MECHANICAL STRENGTH AND CONTAINING MOLECULAR SIEVE

[75] Inventors: Helmut Derleth; Guenther Sauer; Karl-Heinz Bretz, all of Nienburg, Fed. Rep. of Germany

[73] Assignee: Kali-Chemie Aktiengesellschaft, Hannover, Fed. Rep. of Germany

[21] Appl. No.: 637,695

[22] Filed: Aug. 6, 1984

Related U.S. Application Data

[63] Continuation of Ser. No. 271,808, Jun. 8, 1981, abandoned, which is a continuation of Ser. No. 158,405, Jun. 11, 1980, abandoned, which is a continuation of Ser. No. 009,029, Feb. 2, 1979, abandoned.

[30] Foreign Application Priority Data

Feb. 10, 1978 [DE] Fed. Rep. of Germany ....... 2805546

[51] Int. Cl.$^4$ .......................... B01J 29/04; B01J 20/18
[52] U.S. Cl. ........................................ 502/64; 502/65; 502/66; 502/70
[58] Field of Search .............. 252/455 Z, 451; 502/64, 502/66, 70, 60, 63, 65

[56] References Cited

U.S. PATENT DOCUMENTS

| | | | |
|---|---|---|---|
| 2,941,958 | 6/1960 | Connor, Jr. et al. | 252/455 R |
| 3,181,231 | 5/1965 | Breck | 502/60 X |
| 3,262,890 | 7/1966 | Mitchell et al. | 252/455 Z |
| 3,356,450 | 12/1967 | Heinze | 502/60 X |
| 3,381,454 | 5/1968 | Sponsel | 252/455 Z |
| 3,410,808 | 11/1968 | Smith et al. | 502/65 |
| 3,436,356 | 4/1969 | Kato et al. | 252/455 Z |
| 3,714,072 | 1/1973 | Maat et al. | 252/455 Z |
| 4,239,655 | 12/1980 | Inoue et al. | 502/60 |

FOREIGN PATENT DOCUMENTS

| | | | |
|---|---|---|---|
| 1164995 | 3/1964 | Fed. Rep. of Germany | 502/63 |
| 1944879 | 3/1971 | Fed. Rep. of Germany | 502/60 |
| 1003266 | 9/1965 | United Kingdom | 502/60 |

*Primary Examiner*—Carl F. Dees
*Attorney, Agent, or Firm*—Schwartz, Jeffery, Schwaab, Mack, Blumenthal & Evans

[57] ABSTRACT

Disclosed is a product and process for the production of granules of high mechanical strength comprising mixing a molecular sieve and a metal oxide into a paste with a silicate, shaping the paste into granules, subjecting the shaped granules to an exchange of bases, drying the granules and tempering the granules at 300° to 400° C.

22 Claims, No Drawings

PRODUCT AND PROCESS FOR THE PRODUCTION OF GRANULES OF HIGH MECHANICAL STRENGTH AND CONTAINING MOLECULAR SIEVE

This is a continuation of application Ser. No. 271,808, filed June 8, 1981, abandoned, which in turn is a continuation of Ser. No. 158,405, now abandoned, which in turn is a continuation of Ser. No. 009,029, now abandoned.

FIELD OF THE INVENTION

The invention relates to granules of molecular sieves and an improved process for their production. More specifically, granules of molecular sieves of good mechanical strength and high adsorption capacity are produced from metal oxides and water soluble silicates according to the process of the invention.

BACKGROUND OF THE INVENTION

Molecular sieves are usually obtained from industrial production in the form of crystalline powders with a fine particle size. These molecular sieves must, therefore, be shaped into larger agglomerates for most applications. For their use as drying media, problems in shaping often arise because granules of high mechanical strength must be produced without reducing the adsorption capability of the molecular sieve.

In most of the known processes for the production of shaped bodies from molecular sieves water glass and/or clay are used as binders. Even though the bodies obtained may possess adequate mechanical strength, their water adsorption capability is reduced. Thus, West German Published Application No. 1 192 164 describes a process for the manufacture of molecular sieves in a spherical shape, wherein finely crystalline molecular sieves are mixed with water glass to form a paste and dripped into an aqueous solution of sodium, alkaline earth metal, nickel, cobalt or aluminum salts as the solidification liquid. The spheres obtained by the process have good water absorption capabilities, but their mechanical strength is entirely inadequate.

According to the process described in West German Published Application No. 1 165 562, the granulation of molecular sieves is attained by stirring them with a silicic acid sol into a flowable suspension having a pH value of 8.0 to 10.0, preferably 8.2 to 9.0, mixing the suspension with small amounts of a suspension of magnesium oxide and dripping the mixture into a liquid immiscible with water; the granules are then dried and hardened by means of a heat treatment. The adsorption capacity of the granules obtained in this manner corresponds to the adsorption capacity of the zeolite contained therein. The difficulty inherent in the process resides in the fact that the zeolite-silica sol must be adjusted to a narrow pH range. This is because in the case of excessively low alkalinity, the zeolite solution converts at a relatively rapid rate into a soft gel; at only slightly higher pH values, on the other hand, magnesium oxide loses its effectiveness as a gelling agent completely. Molecular sieves must therefore be freed of appreciable amounts of alkaline contamination by means of a thorough washing. In addition, the spheres of the gel have no wet strength prior to hardening. Special measures must therefore be taken to prevent their agglomeration and their adherence to the walls of vessels, a condition which eventually may lead to incrustations.

DESCRIPTION OF THE INVENTION

A process has now been discovered for the production of granules containing molecular sieves. The process is free of the aforementioned disadvantages and the granules produced are characterized by good mechanical strength and high adsorption capacity. According to the process of the invention, the components molecular sieve, metal oxide and silicate are made into a paste, shaped by mechanical means or by dripping into a precipitating solution and, following an exchange of bases, dried and tempered. By means of the selection of the oxide and/or the molecular sieve, granulates are obtained which find applications as adsorption media, catalyst or catalyst carriers. In another embodiment, a powder of a molecular sieve and metal oxide are mixed to a paste in a silicate solution, possibly with the addition of water, the mixture is shaped, subjected to an exchange of bases, dried at 100°–140° C. and tempered at 300° to 400° C.

When magnesium oxide is used as the metal oxide, the granules surprisingly exhibit an adsorption capacity higher than the existing molecular sieve proportion in an amount up to 123%.

Metal oxides suitable for use in the process of the invention, in addition to magnesium oxide, are the oxides of copper, barium, zinc, the rare earths, titanium, tin, lead, vanadium, antimony, chromium, manganese, iron, cobalt or nickel, or their mixtures, respectively. The process yields mechanically strong granules which may also find application as catalysts or catalyst carriers.

For the application of the granules as drying media, the use of magnesium oxide is primarily recommended, but the oxides of other metals also produce increased adsorption capacities. Thus, the choice and dosage of the metal oxide addition permits the adjustment of the adsorption capacity of the granules. The following series of decreasing effectiveness has been established:

MgO increase in adsorption capacity of 22–123%,
CuO increase in adsorption capacity of approx. 37%,
$Fe_2O_3$ increase in adsorption capacity of approx. 18%,
$TiO_2$ increase in adsorption capacity of approx. 11%,
$Cr_2O_3$ increase in adsorption capacity of approx. 9%,
$SnO_2$ increase in adsorption capacity of approx. 8%,
$Sb_2O_3$ increase in adsorption capacity of approx. 8%,
NiO increase in adsorption capacity of approx. 4%,
ZnO increase in adsorption capacity of approx. 2%,
PbO increase in adsorption capacity of approx. 1%,
$MnO_2$ decrease in adsorption capacity of approx. 3%,
$V_2O_5$ decrease in adsorption capacity of approx. 12%,
$Co_2O_3$ decrease in adsorption capacity of approx. 15%,
$RE_2O_3$ (rare earths) decrease in adsorption capacity of approx. 16%,
BaO decrease in adsorption capacity of approx. 39%.

Normally, metal oxides producing a reduction in adsorption capacity, will not be applied as drying media, but these granules are used as catalysts or catalyst carriers.

The content of the individual components of the granules may vary within wide limits. With respect to the total solids content of the granules, the metal oxides may be employed in total amounts of about 5% to about 94%, preferably 9% to about 50% by weight, the molecular sieve in amounts of about 1% to about 95%, preferably 27% to about 79% by weight and the water soluble silicate in total amounts of about 5% to about 50%, preferably 12% to about 28% by weight, calculated as the solid, i.e. as $SiO_2$+possibly $Na_2O$. The tempered granules then have practically the same composition. If water glass is used, the $SiO_2$ proportion of the granules is correspondingly lower. The MgO containing granules used preferably as drying media contain 1% to 95%, preferably 27% to 79% by weight of a molecular sieve, 5% to 94%, preferably 9% to 50% by weight MgO and 5% to 38%, preferably 9% to 22% by weight $SiO_2$.

Sodium or potassium water glass or guanidine silicate and their mixtures are suitable for use as the silicate solution. The use of guanidine silicate introduces no additional sodium ions into the granules, because the guanidine component rapidly decomposes and volatilizes at temperatures beginning at 120° C. Suitable are guanidine silicate solutions with a $SiO_2$ content of 20 to 40% by weight, preferably 25 to 35% by weight. In a sodium silicate solution the mole ratio of $Na_2O$ to $SiO_2$ should be 0.26 to 0.49, preferably 0.27 to 0.30.

The most different types of molecular sieves, e.g., the well-known A, X, Y, SK 20 type of their mixtures may be processed into granules. They may also be present in the ion exchanged form.

Deformation may take place both mechanically and by means of precipitation granulation. Mixtures of powders of molecular sieves, metal oxide and silicate solution may be extruded, tabletted or shaped on a rotary table, a pelletizing drum or by means of merumerizers.

For the deformation of the mixture by dripping into a precipitating solution, preferably an aqueous solution of an ammonium salt, such as ammonium sulfate, ammonium acetate, ammonium chloride, is used. This provides the advantage that no foreign ions are introduced into the granules. The concentration of the ammonium salt solution may be between 12% and 36%, preferably is between 15% and 33%.

To provide a suitable consistency of the mixture, the water content, including the water originating in the silicate solution, should amount to 25%–56%, preferably 31% to 53% by weight in the case of mechanical shaping, and to 45% to 200%, preferably 47% to 163% by weight for deformation by means of precipitation, always with respect to the total solids content.

The exchange of bases takes place in a known manner such as by means of a solution of an ammonium salt. It is advantageous to apply the solution of the ammonium salt after mechanical forming in a concentration of 5% to 33%, preferably 15% to 25%, and after shaping by means of precipitation in a concentration of 2% to 10%, preferably 3% to 5%.

Drying may be performed at room temperature or elevated temperatures; temperatures of 100° to 140° C. are recommended.

The process of the invention offers numerous advantages over the state of the art:
1. It is not necessary to maintain a narrowly limited pH range; there is no danger of premature gelling and a strongly alkaline pH value poses no interference.
2. Due to the possibility of shaping by mechanical means, a substantially higher fracture hardness may be obtained.
3. By using an aqueous solidification solution in place of an organic precipitating liquid, the contamination of the granules by an organic substance and thus their dark coloring may be prevented; organic substances are decomposed during tempering leading to the formation of carbon inclusions. In contrast, an exchange of bases already takes place in the ammonium salt precipitating solution; no foreign ions are introduced.
4. Water glass is considerably less expensive than stabilized silica sol, the preparation of the latter by the conventional process using ion exchangers is difficult and expensive. No additional sodium ions, to be removed later, are introduced when a guanidine silicate solution is used.
5. A commercial grade of magnesium oxide may be utilized. It is not necessary to use magnesia usta extra light initially in order to obtain a suitable hydrated magnesium oxide.

In spite of this simplification of the process and the reduction of its cost, the granules obtained represent substantial improvement in technical progress over the prior art:
1. An increase in the adsorption capacity at a relative humidity of 20% at 25° C., by up to a maximum of 123% over the molecular sieve content, combined with good mechanical strength of the granules. Simultaneously, a saving in the expensive molecular sieve material by the substitution of less expensive materials, such as, e.g., magnesium oxide, is obtained.
2. In the case of shaping by precipitation, the gel pearls have good wet strength, i.e. the pearls do not fracture during handling and during the base exchange; rejection waste is thus slight.
3. The granules are water proof; i.e. they do not burst when in contact with spray water or placed in water.
4. Shaped bodies and spherical granules with different diameters may be produced.

For the production of spherical granulates of medium to the smallest dimensions, the precipitation method is preferred; mechanical forming is particularly suitable for the manufacture of large bodies.
5. Molecular sieves of the most varied types, e.g. types A, X, Y, SK 20, also ion exchanged molecular sieves may be shaped into granules by the process of the invention.

With the molecular sieve X it is even possible to obtain an increase in the water vapor adsorption capacity at a relative humidity of 20%, at 25° C., to 182% over the capacity of the proportion of the molecular sieve present.

EXAMPLES

A molecular sieve powder, metal oxide powder and silicate solution, possibly together with water, are intermixed in the amounts shown in the tables presented hereinafter in an arbitrary sequence. The water glass used has a density of 1.362, the mole ratio of $Na_2O:SiO_2$ is 0.2943; the quanidine silicate solution has a concentration of 25% by weight, calculated as $SiO_2$.

The initial mixture is shaped
(a) in Examples 1 to 4, mechanically by means of extrusion and comminution, followed by rounding on a rotary plate with standing side walls;

(b) in Example 5, by dripping into an aqueous solution of an ammonium salt of the concentration given in the tables.

To facilitate formation of the spherical shape, the ammonium salt solution has a top layer of mineral oil, with a thickness of a few cm.

The solidified granules are taken from the precipitating solution after 10 minutes.

Shaping is followed by a 4 hour base exchange at room temperature, rinsing with water, drying at 120° C. and tempering at 350° to 400° C.

Results are presented in the tables following hereinafter:

| | | |
|---|---|---|
| Example 1 | magnesium oxide | Table I |
| Example 2 | other oxides | Table II |
| Example 3 | mixture | Table III |
| Example 4 | different molecular sieves | Table IV |
| Example 5 | shaping by precipitation | Table V |

In Examples 1 to 3 and 5, molecular sieves of type A were always used. As may be seen in table III, clay may also be used as an auxiliary material in granulating without an excessive decrease in adsorption capacity.

The bursting pressure of the granules is measured by an instrument of the Zwich Co. For this purpose, the bead is placed on a movable table, which is pressured upward against a punch. The pressure whereby the bead bursts is given in kg and represents the bursting pressure.

The abbreviations in the tables have the following significance:

| | |
|---|---|
| MS | molecular sieve |
| MeO | metal oxide |
| Gua | guanidine silicate |
| WK | water glass |
| B | bursting pressure of spherical granules with a diameter of 2-5 mm in a kg. per bead (average value of 25 determinations) |
| A | adsorption of water vapor at 20% relative humidity and 25° C. in % by weight* |
| Z | increase in adsorption capacity in % with respect to the molecular sieve used |
| Base exchange solution: | Su - ammonium sulfate<br>Az - ammonium acetate<br>Cl - ammonium chloride |

*the water vapor adsorption is:
| | |
|---|---|
| for the molecular sieve A used | 23% by weight |
| for the molecular sieve Y used | 27% by weight |
| for the molecular sieve SK 20 used | 27% by weight |
| for the molecular sieve X used | 11% by weight |

As molecular sieves all known types can be used. As reference concerning the synthesis of these zeolites, W. D. Breck, "Zeolite molecular sieves" (1974), chapter IV, may be cited.

Zeolites used in the examples were synthesised by processes, disclosed in U.S. 2 882 243, U.S. pending application Ser. No. 876 050 and DE-OS 24 47 206. Zeolite SK 20 is a commercially available molecular sieve X (produced by Linde or Union Carbide).

KEY TO TABLES

1. Experiment No.;
2. Amounts Used;
3. Composition of the Granules in % by weight, Solids;
4. Base Exchange Solution;
5. Concentration;
6. Salt;
7. Precipitating Solution;
8. % by weight.

TABLE I

| | Amounts Used | | | | | Magnesium Oxide Composition of the Granules in a % by wgt. | | | | Base Exchange Solution | | | | |
|---|---|---|---|---|---|---|---|---|---|---|---|---|---|---|
| | | | | Water | | | Solids | | | | | | | |
| Experiment Number | MS g | MgO g | Gua g | Glass g | H₂O g | MS | MgO | Gua (SiO₂) | Water Glass | NH₄ Salt | Concentration wgt. % | B | A | Z |
| 1 | 100.0 | 9.9 | 52.6 | | 21.1 | 77.8 | 9.3 | 12.9 | | Su | 16.5 | 6.1 | 21.8 | 22 |
| 2 | 100.0 | 15.0 | 80.0 | | 40.0 | 69.8 | 12.7 | 17.5 | | Su | 16.5 | 9.2 | 20.0 | 24 |
| 3 | 100.0 | 22.2 | | 83.3 | 31.1 | 61.2 | 16.5 | | 22.3 | Az | 20.0 | 7.4 | 20.4 | 45 |
| 4 | 100.0 | 28.9 | | 77.3 | 30.3 | 59.2 | 20.8 | | 20.0 | Su | 20.0 | 6.6 | 19.9 | 46 |
| 5 | 100.0 | 32.3 | | 121.0 | | 52.1 | 20.4 | | 27.5 | Su | 20.0 | 8.2 | 17.7 | 48 |
| 6 | 100.0 | 150.0 | | 200.0 | | 27.1 | 49.3 | | 23.6 | Su | 25.0 | 5.1 | 13.8 | 123 |

TABLE II

| | Amounts Used | | | | | | Other Oxides | Base Exchange Solution | | | |
|---|---|---|---|---|---|---|---|---|---|---|---|
| | | | | | Water | | | | | | |
| Experiment Number | MS g | MgO g | MeO Type | Gua g | Glass g | H₂O g | NH₄ Salt | Concentration wgt. % | B | A | Z |
| 1 | 100.0 | 18.5 | CuO | | 111.1 | 9.3 | Su | 20.0 | 5.0 | 17.0 | 37 |
| 2 | 100.0 | 13.7 | BaO | | 51.4 | 13.7 | Cl | 20.0 | 4.5 | 10.0 | −39 |
| 3 | 100.0 | 10.0 | ZnO | | 50.0 | 15.0 | Az | 20.0 | 6.5 | 17.4 | 2 |
| 4 | 100.0 | 7.3 | ZnO | 58.0 | | 7.3 | Cl | 15.0 | 3.6 | 18.5 | 2 |
| 5 | 100.0 | 23.3 | RE₂O₃ | | 87.2 | 9.3 | Su | 20.0 | 3.0 | 11.8 | −16 |
| 6 | 100.0 | 17.4 | TiO₂ | | 65.2 | 13.0 | Cl | 20.0 | 7.1 | 17.0 | 11 |
| 7 | 100.0 | 17.4 | TiO₂ | | 65.2 | 13.0 | Su | 20.0 | 6.9 | 17.0 | 11 |
| 8 | 100.0 | 21.1 | SnO₂ | | 105.2 | | Su | 20.0 | 2.9 | 14.5 | 8 |
| 9 | 100.0 | 17.9 | PbO | | 89.3 | | Su | 20.0 | 5.0 | 14.2 | 1 |
| 10 | 100.0 | 11.1 | V₂O₅ | 33.3 | 36.7 | 57.8 | Su | 20.0 | 3.6 | 14.2 | −12 |
| 11 | 100.0 | 23.6 | Sb₂O₃ | | 88.3 | | Su | 20.0 | 4.5 | 14.8 | 8 |
| 12 | 100.0 | 17.6 | Cr₂O₃ | | 70.2 | 3.5 | Su | 20.0 | 4.5 | 16.3 | 9 |
| 13 | 100.0 | 20.0 | MnO₂ | | 75.0 | | Su | 20.0 | 5.9 | 14.2 | −3 |

TABLE II-continued

| | | | Amounts Used | | | | Base Exchange Solution | | | | |
|---|---|---|---|---|---|---|---|---|---|---|---|
| Experiment Number | MS g | MgO g | MeO Type | Gua g | Water Glass g | H$_2$O g | NH$_4$ Salt | Concentration wgt. % | B | A | Z |
| 14 | 100.0 | 23.8 | Fe$_2$O$_3$ | | 89.3 | | Su | 20.0 | 4.5 | 16.0 | 18 |
| 15 | 100.0 | 22.0 | Co$_2$O$_3$ | | 82.4 | | Su | 20.0 | 6.0 | 12.0 | −15 |
| 16 | 100.0 | 17.4 | NiO | | 87.2 | | Su | 20.0 | 3.6 | 15.0 | 4 |

TABLE III

| | Mixture Amount Used | | | | | | | | Base Exchange Solution | | | | |
|---|---|---|---|---|---|---|---|---|---|---|---|---|---|
| Experiment Number | MS g | MgO g | ZnO g | Bentonite g | TiO$_2$ g | Gua g | Water Glass g | H$_2$O g | NH$_4$ Salt | Concentration wgt. % | B | A | Z |
| 1 | 100.0 | | 5.0 | 15.0 | | 5.0 | 40.0 | | Cl | 15.0 | 9.2 | 15.9 | −2 |
| 2 | 100.0 | | 5.0 | 10.0 | | 5.0 | 37.5 | 23.5 | Cl | 15.0 | 4.7 | 17.6 | 3 |
| 3 | 100.0 | | 10.0 | 3.0 | | | 50.0 | 10.0 | Az | 20.0 | 4.4 | 17.3 | 4 |
| 4 | 100.0 | | 6.0 | 15.0 | | 4.0 | 40.0 | 15.0 | Az | 20.0 | 7.7 | 17.4 | 7 |
| 5 | 100.0 | 5.9 | 5.9 | 10.6 | | | 58.8 | 23.5 | Az | 20.0 | 7.9 | 16.5 | 9 |
| 6 | 100.0 | 7.7 | | | 7.7 | | 57.7 | 20.0 | Su | 20.0 | 4.9 | 18.0 | 13 |
| 7 | 100.0 | 5.6 | 5.6 | 6.7 | | | 55.6 | 11.1 | Az | 20.0 | 5.3 | 18.2 | 14 |
| 8 | 100.0 | 25.0 | | 10.0 | | 70.0 | 30.0 | 25.0 | Su | 20.0 | 2.4 | 19.6 | 50 |

TABLE IV

| | Different Molecular Sieves | | | | | | | | | | |
|---|---|---|---|---|---|---|---|---|---|---|---|
| | Amount Used | | | | | Base Exchange Solution | | | | | |
| Experiment Number | MS g | MS Type | MgO g | Water Glass g | H$_2$O g | NH$_4$ Salt | Concentration % | B | A | Z |
| 1 | 100.0 | Y | 39.0 | 103.9 | 32.5 | Su | 20.0 | 4.2 | 17.9 | 28 |
| 2 | 100.0 | A | 32.3 | 121.0 | | Su | 20.0 | 8.2 | 17.7 | 48 |
| 3 | 100.0 | SK20 | 31.2 | 83.3 | 33.3 | Su | 20.0 | 7.5 | 22.0 | 42 |
| 4 | 100.0 | X | 33.3 | 88.9 | 80.0 | Su | 20.0 | 5.2 | 17.2 | 182 |

TABLE V

| | Shaping by Precipitation | | | | | | | | | | | | |
|---|---|---|---|---|---|---|---|---|---|---|---|---|---|
| | Amounts Used | | | | | | Precipitating Solution | | Base Exchange Solution | | | | |
| Experiment Number | MS g | MgO g | ZrO g | Gua g | Water Glass | H$_2$O g | NH$_4$ Salt | Concentration wgt. % | NH$_4$ Salt | Concentration wgt. % | B | A | Z |
| 1 | 100.0 | | 30.0 | 87.5 | 40.0 | 50.0 | Cl | 15.0 | Az | 5.0 | 2.6 | 15.0 | 18 |
| 2 | 100.0 | 25.0 | | 100.0 | | 25.0 | Cl | 15.0 | Cl | 5.0 | 1.8 | 17.3 | 22 |
| 3 | 100.0 | 23.6 | | 70.6 | 47.0 | 38.9 | Cl | 33.0 | Su | 5.0 | 3.0 | 19.2 | 43 |
| 4 | 100.0 | 30.0 | | 87.5 | 37.5 | 15.0 | Cl | 15.0 | Cl | 5.0 | 3.2 | 20.8 | 64 |
| 5 | 100.0 | 76.9 | | 192.3 | | 69.2 | Su | 25.0 | Su | 3.0 | 2.2 | 18.8 | 107 |

What is claimed is:

1. A process for the production of granules of high mechanical strength and high adsorption capacity comprising forming directly an aqueous paste, the solids thereof consisting essentially of a molecular sieve, a metal oxide and a water soluble silicate, shaping the paste into granules, subjecting the shaped granules to an exchange of bases, drying the granules, and tempering the granules at 300° to 400° C.

2. The process of claim 1 wherein the metal oxide is added in a total amount of from 5% to 94%, the molecular sieve is added in a total amount of from 1% to 95%, and the water soluble silicate is added in a total amount of from 5% to 50% calculated as solids.

3. The process of claim 2 wherein the metal oxide is from 9% to 50% by weight, the molecular sieve is from 27% to 79% by weight and the water soluble silicate is from 12% to 28% by weight.

4. The process of claim 2 wherein the metal oxide is selected from the group consisting of oxides of copper, barium, zinc, magnesium, rare earths, titanium, tin, lead, vanadium, antimony, chromium, manganese, iron, cobalt, nickel and mixtures thereof.

5. The process of claim 1 wherein the silicate is an aqueous solution of sodium silicate with a mole ratio of Na$_2$O:SiO$_2$ of 0.26 to 0.49.

6. The process of claim 5 wherein the mole ratio of Na$_2$O:SiO$_2$ is 0.27 to 0.30.

7. The process of claim 1 wherein the silicate is a guanidine silicate solution with a SiO$_2$ content of from 20% to 40% by weight.

8. The process of claim 7 wherein the SiO$_2$ content is from 25% to 35% by weight.

9. The process of claim 1 wherein the shaping is performed by the dripping of the mixture to be granulated into a precipitating solution.

10. The process of claim 1 wherein the shaping is performed by mechanical means.

11. The process of claim 9 wherein the precipitating solution comprises an aqueous solution of an ammonium salt having a concentration of from 12% to 36% by weight.

12. The process of claim 11 wherein the ammonium salt solution concentration is 15% to 37%.

13. The process of claim 10 wherein the exchange of bases is by treatment of the shaped granules with an ammonium salt solution having a concentration of from 5% to 33%.

14. The process of claim 11 wherein the ammonium salt solution has a concentration of from 15% to 25%.

15. The process of claim 9 wherein the exchange of bases is by treatment of the granules in an ammonium salt solution having a concentration of from 2% to 10%.

16. The process of claim 15 wherein the ammonium salt solution is from 3% to 5%.

17. Granules containing molecular sieves consisting essentially of from 1 to 95% by weight molecular sieve, from 5 to 94% by weight magnesium oxide and from 5 to 46% by weight $SiO_2$ formed by tempering an admixture of molecular sieve, magnesium oxide and a water soluble silicate.

18. The granules of claim 17 comprising 27 to 79% by weight molecular sieve, 9 to 50% by weight magnesium oxide and 10 to 24% by weight $SiO_2$ formed by tempering an admixture of molecular sieve, magnesium oxide and a water soluble silicate.

19. The granules containing molecular sieves produced by a process comprising forming a paste from a mixture consisting essentially of a molecular sieve, a metal oxide and a silicate solution, shaping the paste into granules, subjecting the shaped granules to an exchange of bases, drying the granules and tempering the granules at 300° to 400° C.

20. A catalyst composition comprising the granules defined by claim 19.

21. An adsorption medium comprising the granules defined by claim 19.

22. An adsorption medium as defined in claim 21, containing MgO as metal oxide.

* * * * *